(12) United States Patent
Vikar

(10) Patent No.: US 11,609,665 B2
(45) Date of Patent: Mar. 21, 2023

(54) SYSTEM AND METHOD FOR SHARING AND MANIPULATING DIGITAL CONTENT

(71) Applicant: Peter Andras Vikar, Beacon, NY (US)

(72) Inventor: Peter Andras Vikar, Beacon, NY (US)

(*) Notice: Subject to any disclaimer, the term of this patent is extended or adjusted under 35 U.S.C. 154(b) by 0 days.

(21) Appl. No.: 17/408,290

(22) Filed: Aug. 20, 2021

(65) Prior Publication Data

US 2022/0057893 A1  Feb. 24, 2022

Related U.S. Application Data

(60) Provisional application No. 63/068,265, filed on Aug. 20, 2020.

(51) Int. Cl.
*G06F 3/03* (2006.01)
*G06F 3/044* (2006.01)
(Continued)

(52) U.S. Cl.
CPC .......... *G06F 3/0441* (2019.05); *G06F 3/0442* (2019.05); *G06F 3/0445* (2019.05);
(Continued)

(58) Field of Classification Search
CPC .... G06F 3/0441; G06F 3/0442; G06F 3/0445; G06F 3/0447; G06F 3/0393;
(Continued)

(56) References Cited

U.S. PATENT DOCUMENTS 9,240,268 B2  1/2016  Smoot
2008/0136792 A1*  6/2008  Peng .................. G06F 3/04186
345/174
(Continued)

FOREIGN PATENT DOCUMENTS

CN  105590483 A  5/2016
WO  WO2019085869 A1  5/2019

OTHER PUBLICATIONS

Sony, Listen to Music from an NFC-Capable Device, https://www.sony.com/electronics/support/articles/00088550.
(Continued)

*Primary Examiner* — Lunyi Lao
*Assistant Examiner* — Jarurat Suteerawongsa

(57) ABSTRACT

A system and method for sharing and manipulating digital content allows users an intuitive mechanism with which to interact with touchscreen devices. A provided device with short-range wireless connectivity can interact with a mobile device by providing physical contact points that can be moved or adjusted to interact with displayed content. A series of the physical contact points distributed about the perimeter of the provided device allows an application to collect data regarding the position and orientation of the provided device placed upon the screen of the mobile device. A second set of physical contact points, also made of conductive material, contains at least one individual contact point that functions as a capacitive 'button' when the user touches it. Upon placement of the provided device on the capacitive screen of a mobile device, real-time tracking of the changing touch patterns can provide a more intuitive interface for handling digital content.

10 Claims, 9 Drawing Sheets

(51) Int. Cl.
    *H04W 4/38* (2018.01)
    *H04W 4/80* (2018.01)

(52) U.S. Cl.
    CPC ............ *G06F 3/0447* (2019.05); *H04W 4/38* (2018.02); *H04W 4/80* (2018.02)

(58) Field of Classification Search
    CPC ...... G06F 3/0488; G06F 3/0416; G06F 9/445; G06F 9/451; H04W 4/38; H04W 4/80; H04W 8/005
    See application file for complete search history.

(56) References Cited

U.S. PATENT DOCUMENTS

| | | | |
|---|---|---|---|
| 2017/0123622 A1* | 5/2017 | Koenders | G06F 3/0488 |
| 2020/0081554 A1* | 3/2020 | Eraslan | G06F 3/0338 |
| 2020/0081557 A1* | 3/2020 | Togashi | G06F 3/0362 |

OTHER PUBLICATIONS

Engadget, DoubleTwist's latest trick is NFC-based MP3 sharing between Androids, https://www.engadget.com/2011-05-10-doubletwists-latest-trick-is-nfc-based-mp3-sharing-between-andr.html.

\* cited by examiner

SYSTEM AND METHOD FOR SHARING AND MANIPULATING DIGITAL CONTENT

The current application claims a priority to the U.S. Provisional Patent application Ser. No. 63/068,265 filed on Aug. 20, 2020.

FIELD OF THE INVENTION

The present invention generally relates to portable electronic accessories for mobile devices. More specifically, the present invention provides a passive conductive widget for gestural input designed for mobile devices.

BACKGROUND OF THE INVENTION

An objective of the present invention is to provide a gestural input tool or widget for mobile devices. The present invention is a physical widget that works in tandem with a digital application (app) or other content running on a tablet, smartphone, or other smart device. The device allows the user to trigger and interact with digital content by utilizing one or more sets of conductive contact points capable of triggering touch events when placed on the capacitive screen of the tablet/smartphone and when subsequently moved or adjusted. Such touch events translate to various modes of operation in the app. The widget may also utilize a built-in passive data store device, such as a radio frequency identification (RFID) tag or a near field communication (NFC) tag, and/or a visual tag, such as a barcode or quick response (QR) code, in order to relay a unique set of data to the associated mobile device.

The widget preferably includes multiple conductive contact points that are arranged in two sets. A series of touch points distributed about the perimeter of the widget are made of electrically conductive material to form a first set. The first set allows the app to collect data regarding the position and orientation of the widget placed on the capacitive screen. The second set, also made of conductive material, contains an individual contact point and functions as a capacitive 'button' when the user touches it. Upon placement of the provided device on the capacitive screen of a mobile device, real-time tracking of the changing touch patterns can provide a more intuitive interface for handling digital content, such as music or video playback or other similar functions, than scrolling or manipulating content manually.

DETAILED DESCRIPTION OF THE INVENTION

All illustrations of the drawings are for the purpose of describing selected versions of the present invention and are not intended to limit the scope of the present invention.

Figure 1A:
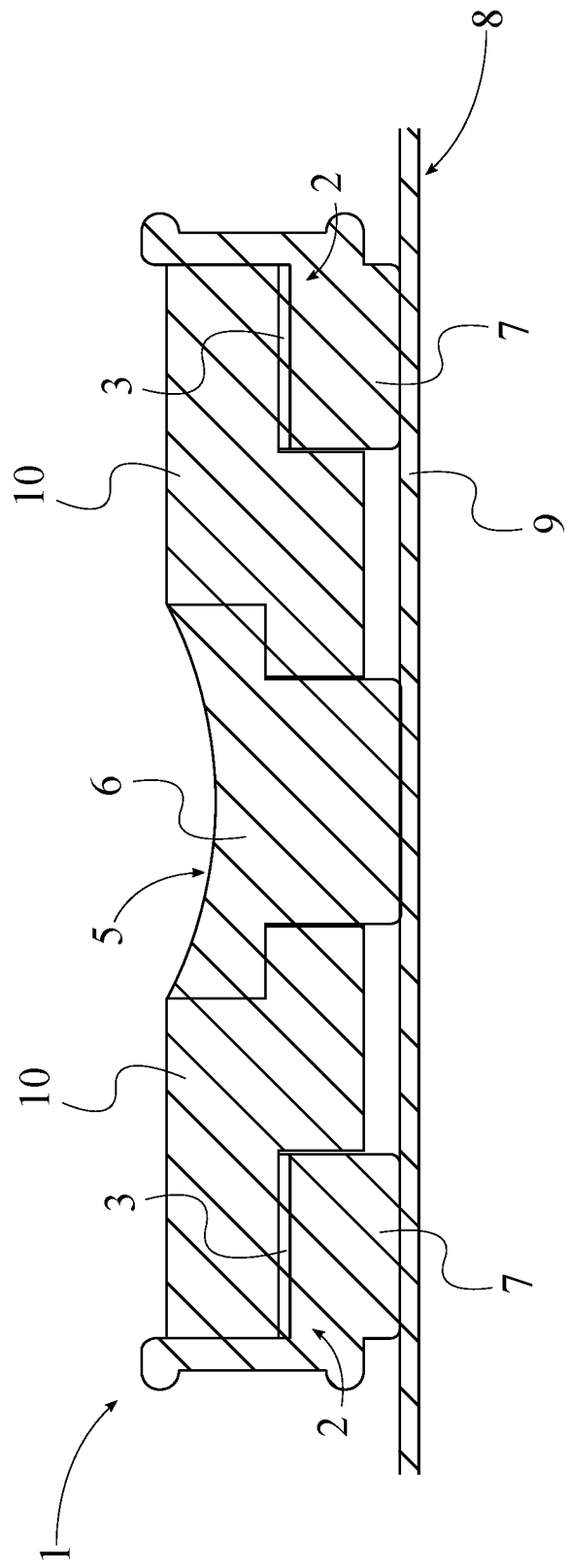
FIG. 1A is a sectional view illustrating the system of the present invention.
Figure 1B:
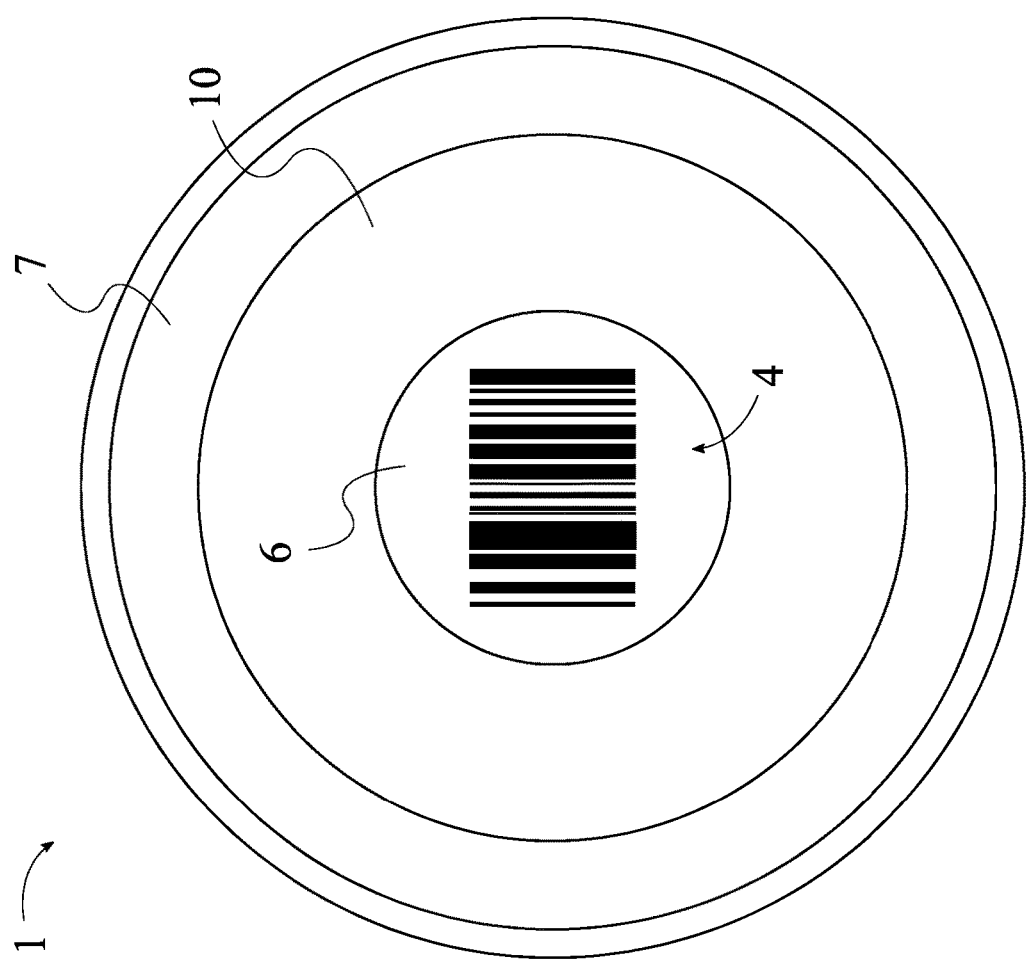
FIG. 1B is a bottom view illustrating the system of the present invention.

The present invention is a system and method for sharing and manipulating digital content that enhances the ability of users to interact with their touchscreen devices. The present invention accomplishes this by providing a device with short-range wireless connectivity that can interact with a mobile device by providing physical contact points that can be adjusted to interact with content. The system of the present invention includes at least one external device 1 and at least one mobile computing device 8, wherein the external device 1 includes at least one instruction-communicating feature 2 and at least one electrically-conductive input module 5, and wherein the instruction-communicating feature 2 includes at least one software instruction (Step A), as represented in FIGS. 1A and 1B. The at least one external device 1 relates to a preferably cylindrical unit equipped to interface with the mobile computing device 8. The at least one mobile computing device 8 relates to any of a variety of smart devices, including iPhones, androids, tablet-style devices, wearables, and other such tools capable of wirelessly communicating with the external device 1. The at least one instruction-communicating feature 2 is a set of programmed electronic commands that direct the external device 1 to a desired website, application, service, or other such output. The at least one electrically-conductive input module 5 is a set of protrusions extending from the external device 1 that enables interaction with the touchscreen of the mobile computing device 8.

Figure 2:
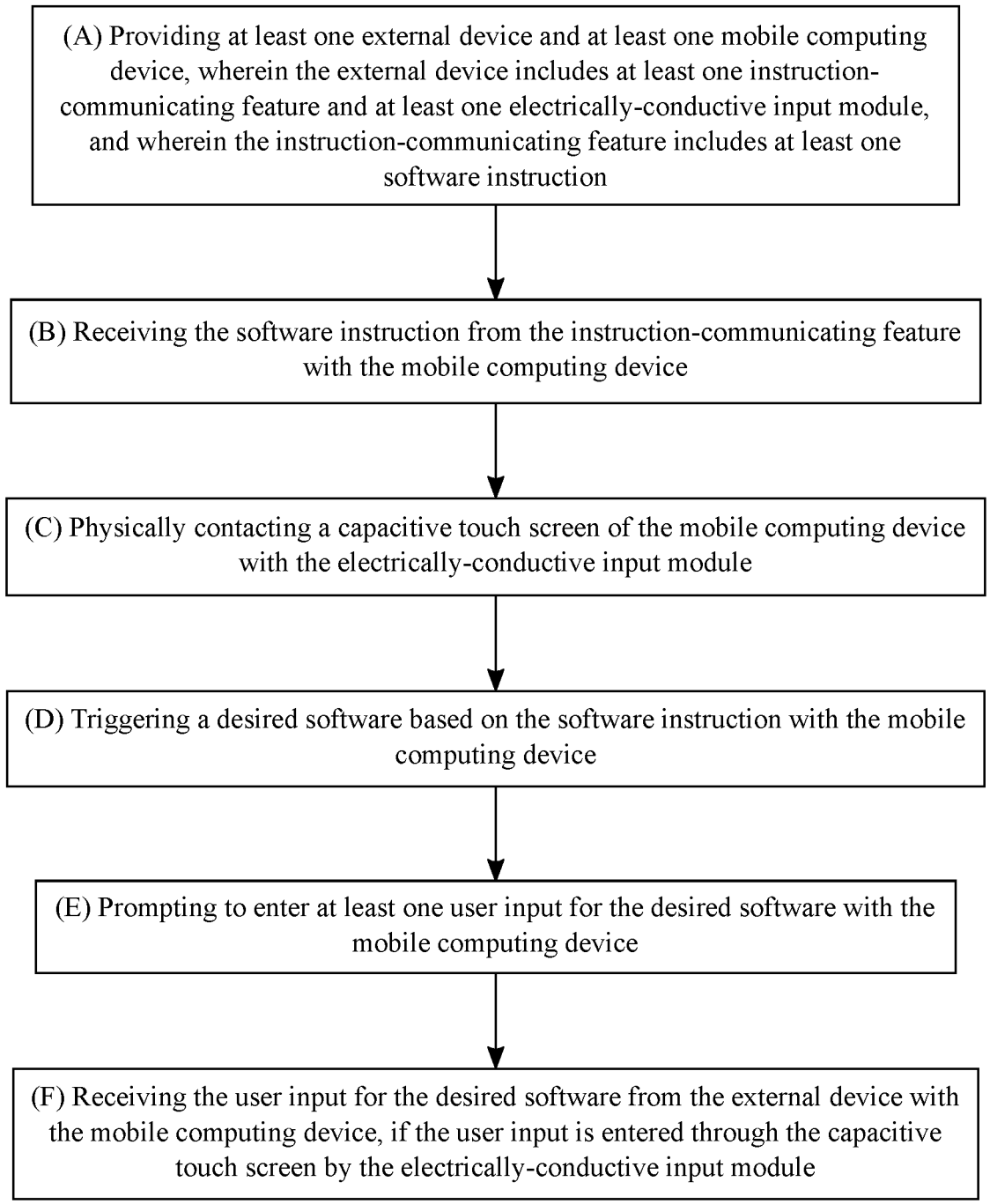
FIG. 2 is a flowchart illustrating the overall process of the present invention.

The overall process followed by the method of the present invention allows for effective and efficient management of the mobile computing device 8 based on inputs from the external device 1. The software instruction is received from the instruction-communicating feature 2 with the mobile computing device 8 (Step B), as represented in FIG. 2. The receipt of the software instruction may be attained through the use of short-range communication methods, scannable information transmission mechanisms, or other such means. A capacitive touch screen 9 of the mobile computing device 8 is next physically contacted with the electrically-conductive input module 5 (Step C). This arrangement allows the mobile computing device 8 to register presence, absence, and changes in the positioning of the external device 1. Subsequently, a desired software is triggered based on the software instruction with the mobile computing device 8 (Step D). The desired software may be an application, a link to an external website, or any other such response. Examples may include scrollable web pages, music or video streaming sites, and more. Next, at least one user input for the desired software is prompted to be entered with the mobile computing device 8 (Step E). The prompted user input may relate to scrolling a web page, adjusting volume, navigating playback content, or other similar commands. Finally, the user input for the desired software is received from the external device 1 with the mobile computing device 8, if the user input is entered through the capacitive touch screen 9 by the electrically-conductive input module 5 (Step F). Thus, the user input may manipulate the output of the mobile computing device 8 as desired based upon inputs from the external device 1.

Figure 3:
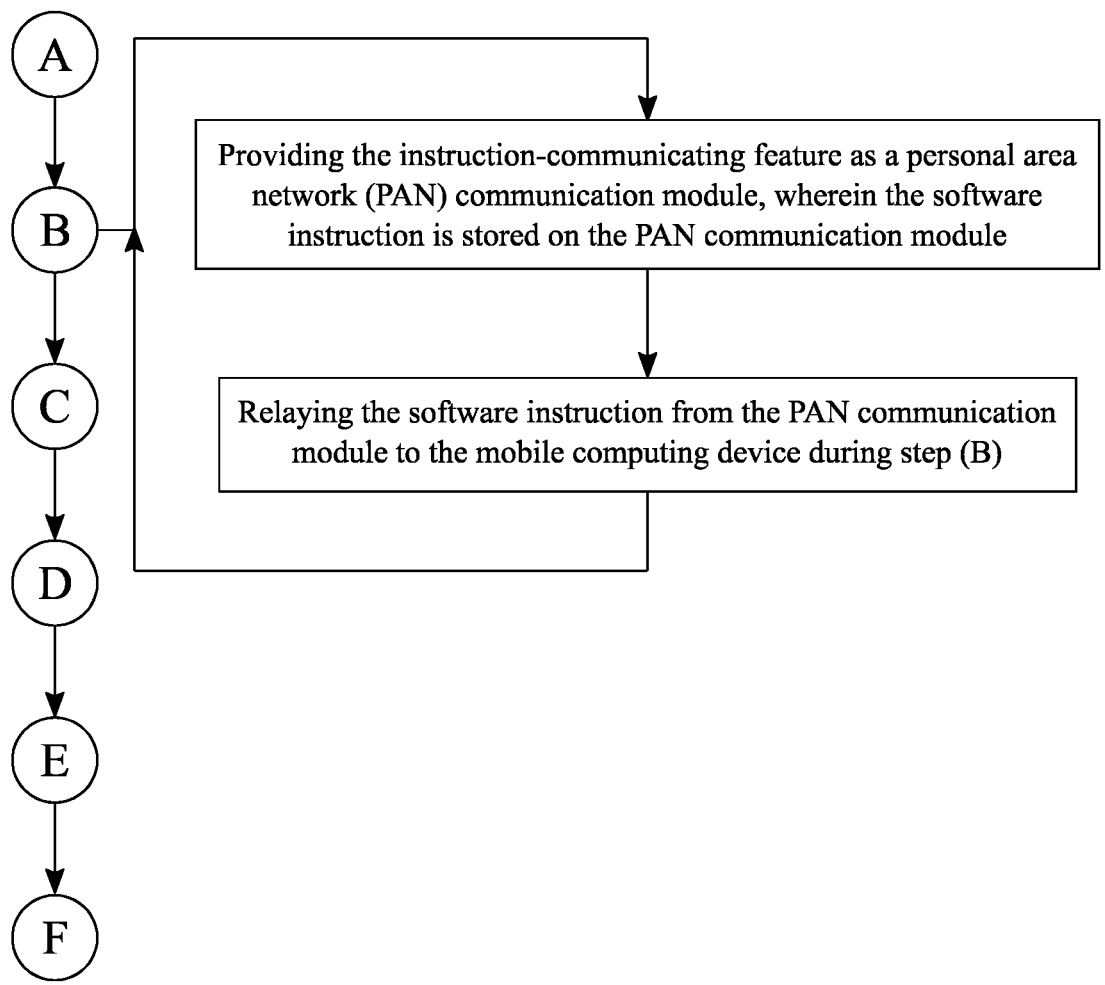
FIG. 3 is a flowchart illustrating a subprocess of communicating with a personal area network module.

It may be beneficial to distribute the present invention with content, as may be the case for musical content producers, office presentations, and the like. To this end, the instruction-communicating feature 2 may be provided as a personal area network (PAN) communication module 3, wherein the software instruction is stored on the PAN communication module 3, as represented in FIG. 3. The PAN communication module 3 may be any type of controller capable of managing electronic signals between the mobile computing device 8 and the external device 1. In an exemplary embodiment, the PAN communication module 3 may include storage capabilities, thus enabling a user to transmit various files between the external device 1 and the mobile computing device 8 for subsequent interaction. The software instruction may subsequently be relayed from the PAN communication module 3 to the mobile computing device 8 during Step B. In this way, the mobile computing device 8 may receive information and guidance from the PAN communication module 3.

Figure 4:
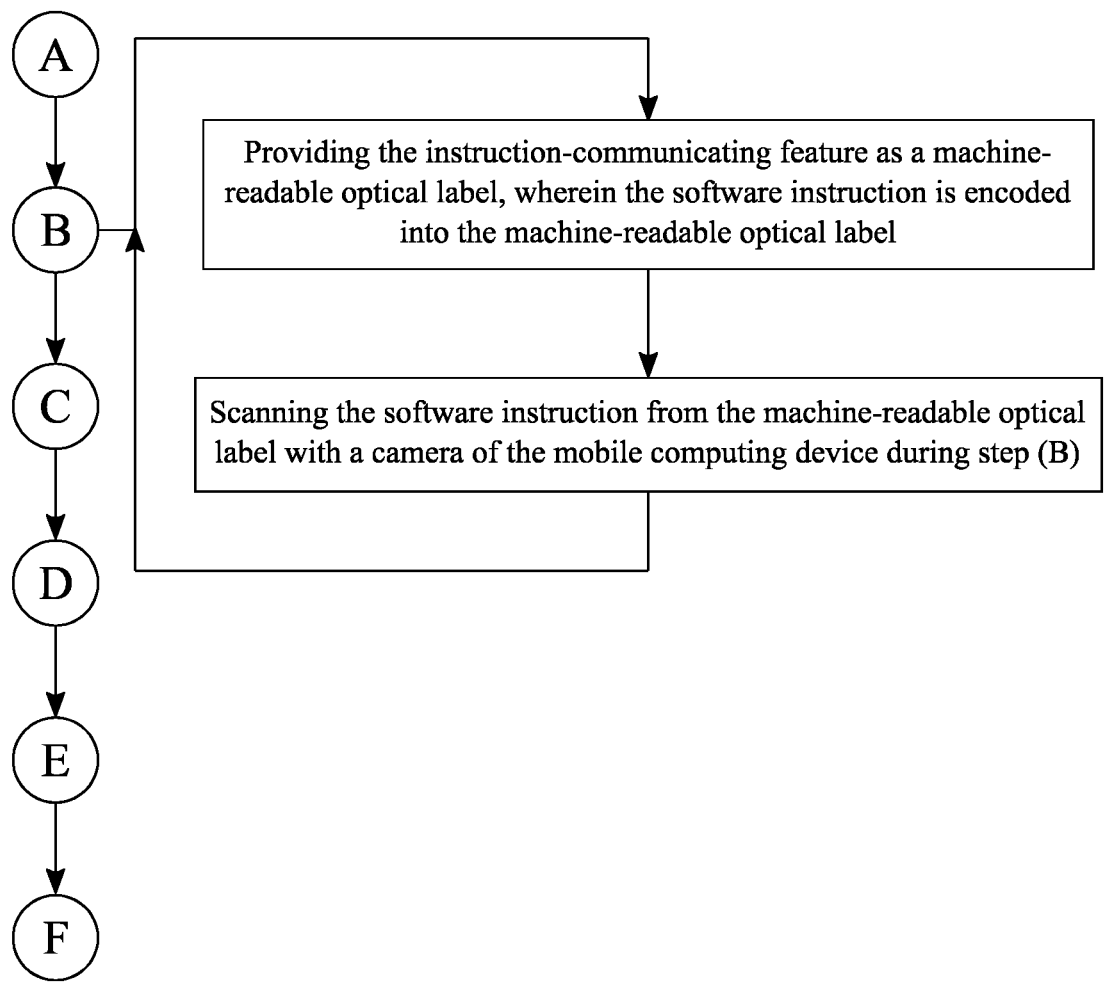
FIG. 4 is a flowchart illustrating a subprocess of scanning optical codes.

It may be advantageous for the present invention to enable code readers, such as barcode scanners and quick response (QR) code scanners, to assist with convenient instruction or site navigation. To this end, the instruction-communicating feature 2 is provided as a machine-readable optical label 4, wherein the software instruction is encoded into the machine-readable optical label 4, as represented in FIG. 4. This arrangement allows for efficient transmission of relevant information. The software instruction is then scanned from the machine-readable optical label 4 with a camera of the mobile computing device 8 during Step B. Thus, the mobile computing device 8 may register and respond to commands printed upon the machine-readable optical label 4.

Figure 5:
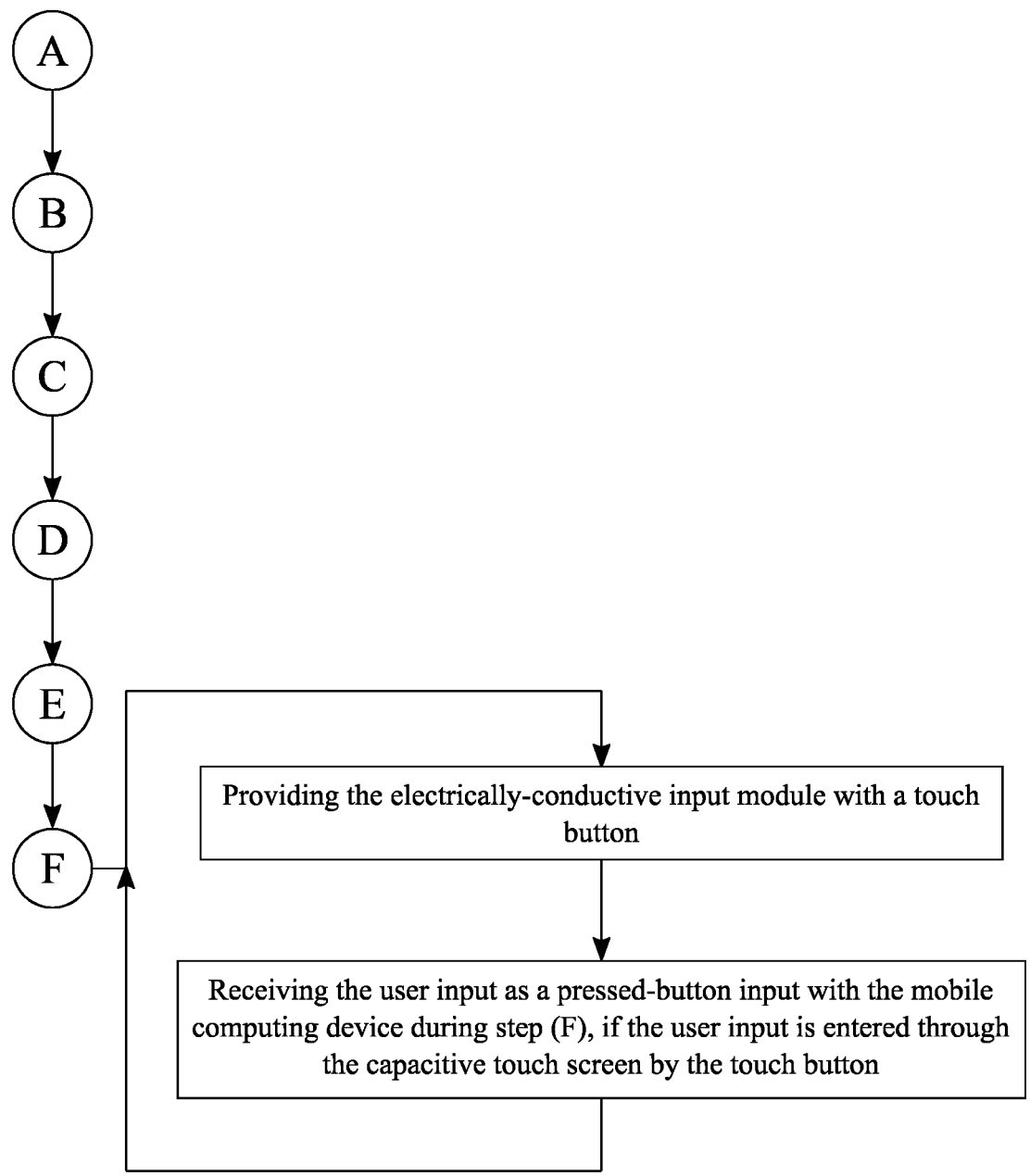
FIG. 5 is a flowchart illustrating a subprocess of accepting user pressure as an input.

In many applications, it may be necessary or desirable to interact with specific components by selecting them. To facilitate such interaction, the electrically-conductive input module 5 may be provided with a touch button 6, as represented in FIG. 5. The touch button 6 is an actuator that may be physically contacted by a user as an input. In a preferred embodiment, the touch button 6 is tapped rather than depressed by the user, thus enabling signal transference through the capacitance of the user rather than through the application of pressure. Subsequently, the user input may be received as a pressed-button input with the mobile computing device 8 during Step F, if the user input is entered through the capacitive touch screen 9 by the touch button 6. This arrangement allows the user to select and confirm inputs upon the mobile computing device 8.

Figure 6:
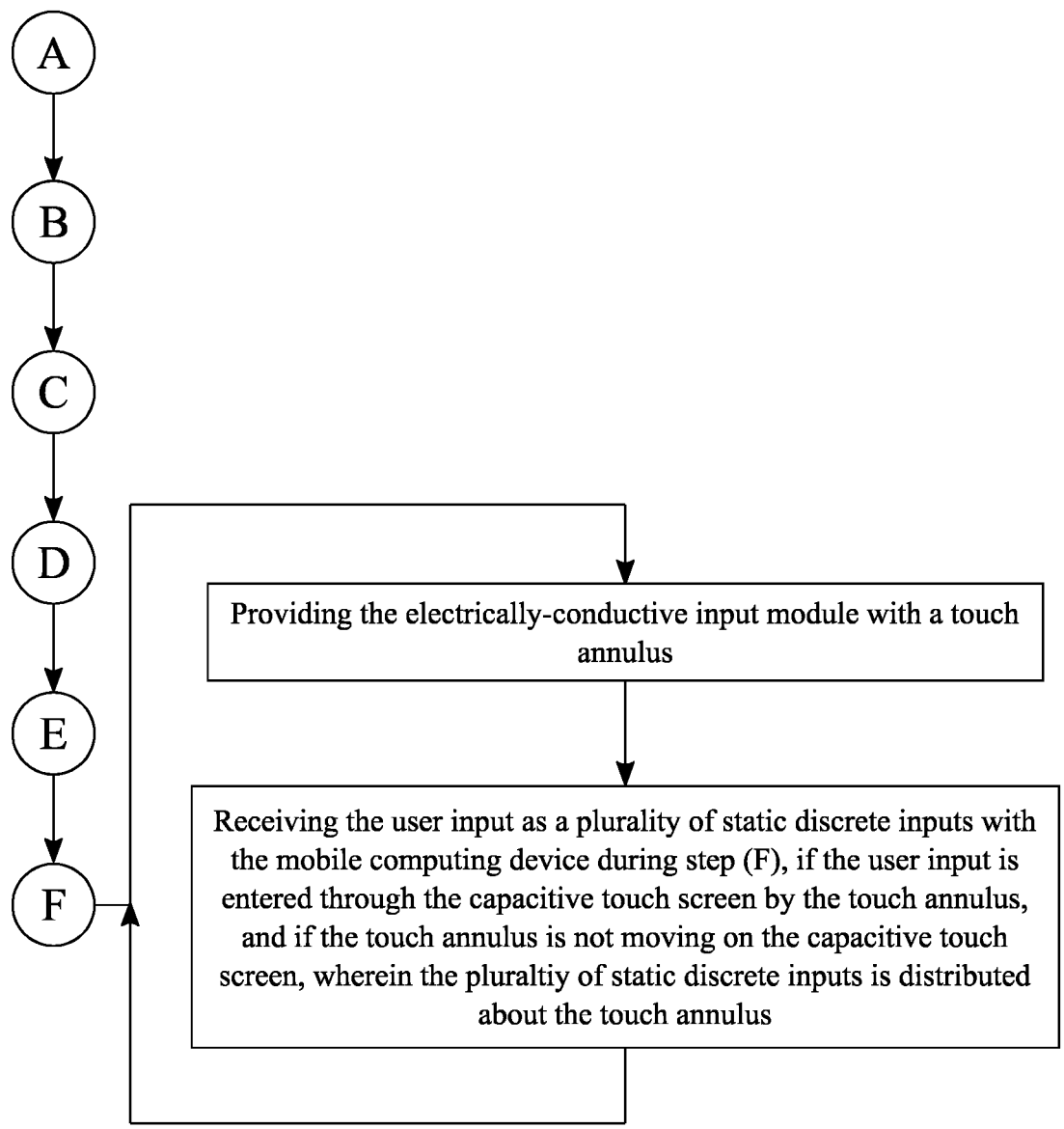
FIG. 6 is a flowchart illustrating a subprocess of accepting contact of discrete conductive units as input.

Furthermore, it is often desirable for software to respond to the presence or absence of the electrically-conductive input module 5. To this end, the electrically-conductive input module 5 may be provided with a touch annulus 7, as represented in FIG. 6. The touch annulus 7 is a disk-shaped unit which may interact with the capacitive touch screen 9 to provide input from a user. The user input may then be received as a plurality of static discrete inputs with the mobile computing device 8 during Step F, if the user input is entered through the capacitive touch screen 9 by the touch annulus 7, and if the touch annulus 7 is not moving on the capacitive touch screen 9, wherein the plurality of static discrete inputs is distributed about the touch annulus 7. In this way, the addition or removal of the electrically-conductive input module 5 may register upon the mobile computing device 8 as an input.

It may be especially beneficial to include several contact points for the touch annulus 7 in order to enhance accuracy and feedback. To this end, the plurality of static discrete inputs may be positioned equidistant from each other about the touch annulus 7. This arrangement provides optimal dispersion of the plurality of static discrete inputs, thereby optimizing input sensitivity.

Figure 7:
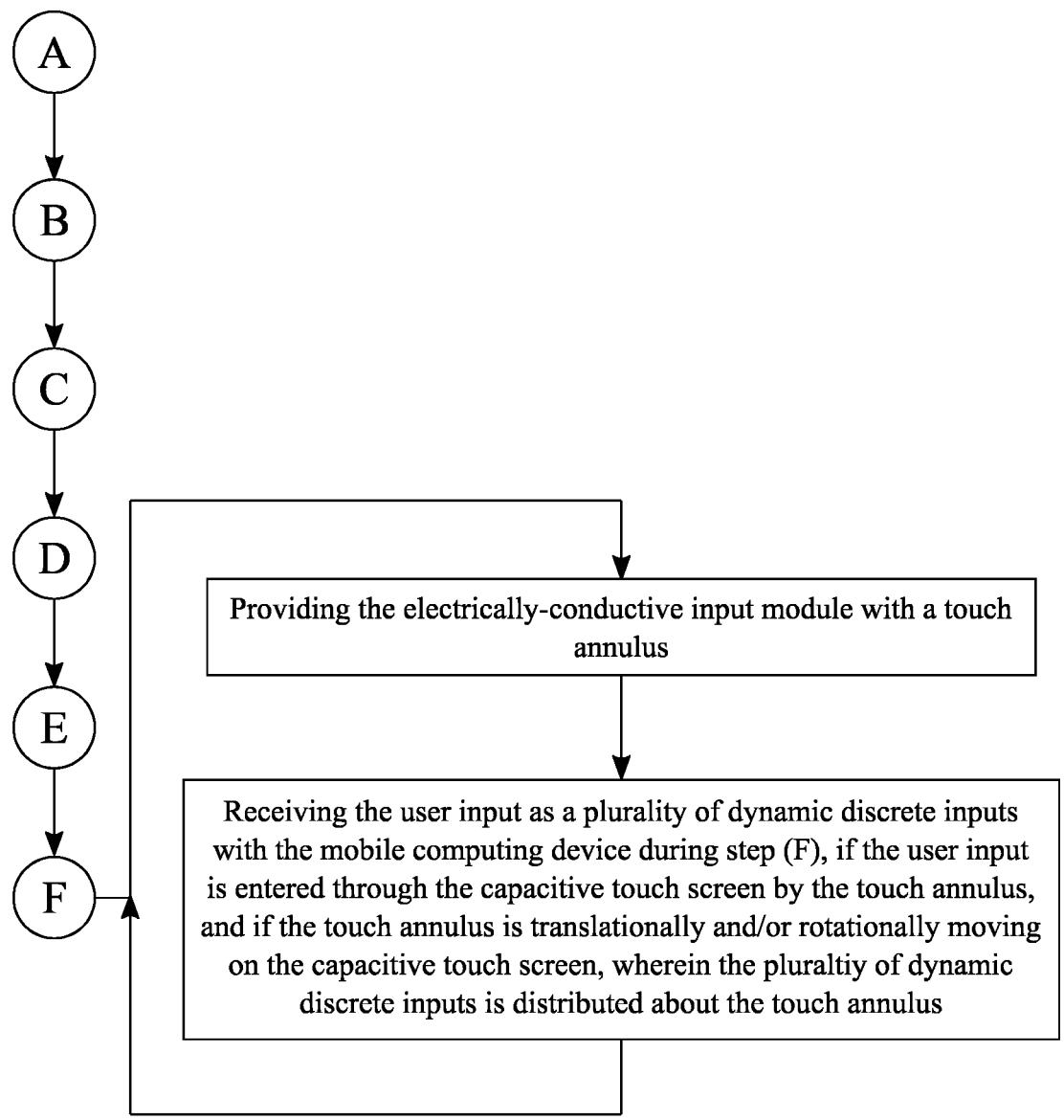
FIG. 7 is a flowchart illustrating a subprocess of accepting motion of discrete conductive units as input.

Many applications benefit further from the ability to accept sliding or tunable inputs. To this end, the electrically-conductive input module 5 may be provided with a touch annulus 7. The user input may then be received as a plurality of dynamic discrete inputs with the mobile computing device 8 during Step F, if the user input is entered through the capacitive touch screen 9 by the touch annulus 7, and if the touch annulus 7 is translationally and/or rotationally moving on the capacitive touch screen 9, wherein the plurality of static discrete inputs is distributed about the touch annulus 7, as represented in FIG. 7. In this way, adjustment of the position of the electrically-conductive input module 5 may register upon the mobile computing device 8 as an input.

This embodiment further benefits from the inclusion of several contact points for the touch annulus 7 in order to enhance accuracy and feedback. To this end, the plurality of dynamic discrete inputs may be positioned equidistant from each other about the touch annulus 7. This arrangement provides optimal dispersion of the plurality of dynamic discrete inputs, thereby optimizing input sensitivity.

In many applications, the user benefits from the ability to provide both toggling and tunable inputs. To this end, the electrically-conductive input module 5 may include a touch button 6 and a touch annulus 7, wherein the touch button 6 is centrally mounted within the touch annulus 7, and wherein the touch annulus 7 is mounted offset from the touch button 6. Thus, a user may be able to, for example, navigate and subsequently select content easily and intuitively.

The plurality of electrically-conductive input modules 5 must be separated from each other in order to separate their corresponding electronic signals. To this end, the external device 1 includes an electrically-insulative filler 10, wherein the at least one electrically-conductive input module 5 is a plurality of electrically-conductive input modules 5, and wherein each of the plurality of electrically-conductive input modules 5 is electrically isolated from each other by the at least one electrically-insulative filler 10. In this way, the electrically-insulative filler 10 prevents transmission of electronic signals between adjacent input modules of the plurality of electrically-conductive input modules 5.

Figure 8:
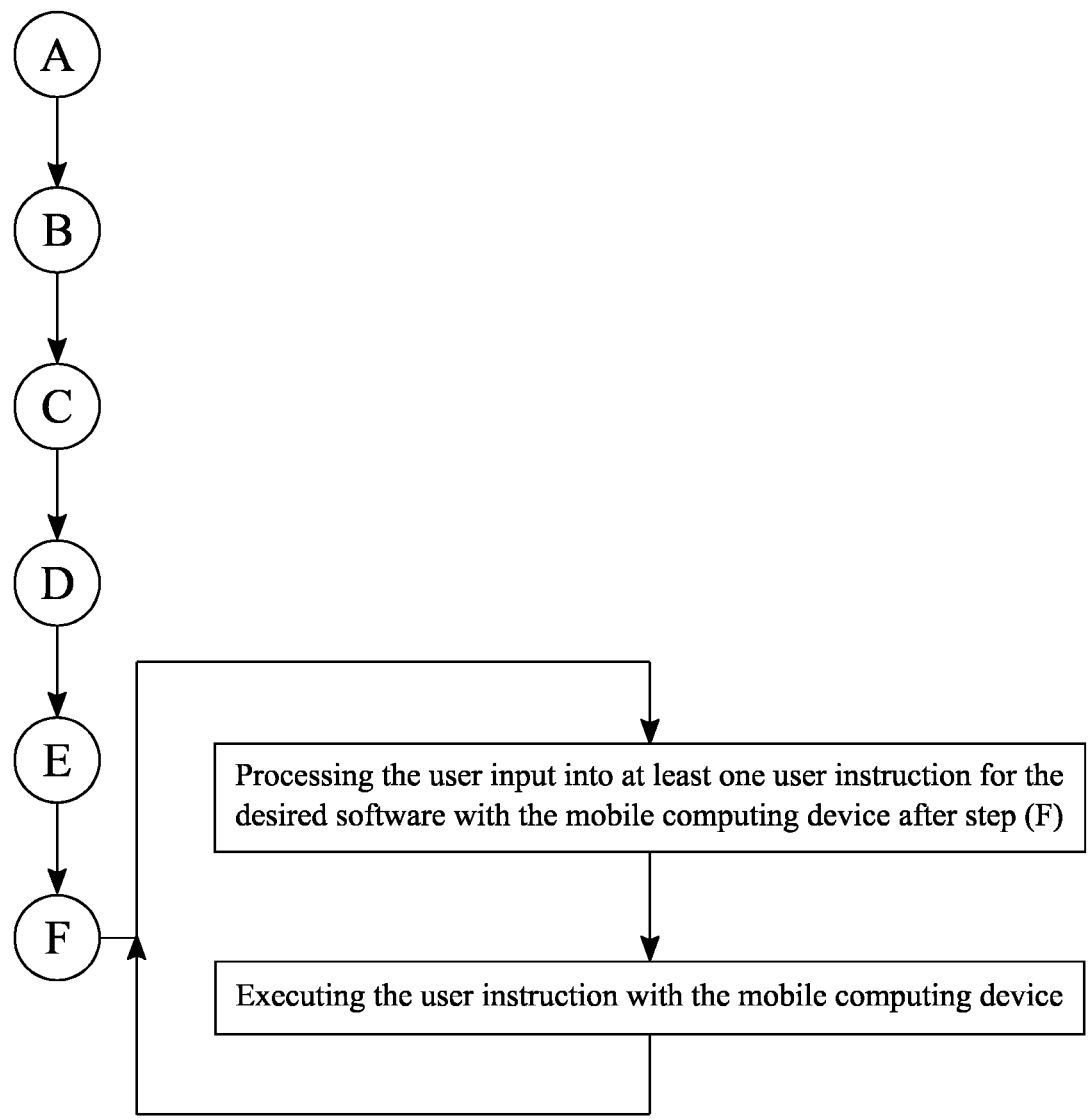
FIG. 8 is a flowchart illustrating a subprocess of executing user instructions from inputs.

The user may wish to interact with content that has loaded onto the capacitive touch screen 9 of the mobile computing device 8. To achieve this, the user input may be processed into at least one user instruction for the desired software with the mobile computing device 8 after Step F, as represented in FIG. 8. The at least one user instruction may include, but is not limited to, scrolling, adjusting volume, adjusting media output, zoom, selecting or interacting with buttons, and more. The user instruction is then executed with the mobile computing device 8. In this way, a user may interact with the content displayed upon the capacitive touch screen 9.

Although the invention has been explained in relation to its preferred embodiment, it is to be understood that many other possible modifications and variations can be made without departing from the spirit and scope of the invention as hereinafter claimed.

What is claimed is:

1. A method of managing supplemental user inputs for a mobile computing device, the method comprising the steps of:

(A) providing at least one external device and at least one mobile computing device, wherein the external device includes at least one instruction-communicating feature, at least one electrically-conductive input module, and an electrically-insulative filler, and wherein the at least one electrically-conductive input module is a plurality of electrically-conductive input modules, and wherein each of the plurality of electrically-conductive input modules is electrically isolated from each other by the at least one electrically-insulative filler, and wherein the instruction-communicating feature includes at least one software instruction, and wherein the software instruction is executable by the mobile computing device and is associated with a desired software managed by the mobile computing device;

(B) receiving the software instruction from the instruction-communicating feature with the mobile computing device;

(C) physically contacting a capacitive touch screen of the mobile computing device with the electrically-conductive input module;

(D) triggering the desired software based on the software instruction with the mobile computing device;

(E) prompting to enter at least one user tactile input for the desired software with the mobile computing device;

(F) receiving the user tactile input for the desired software from the external device with the mobile computing device, if the user tactile input is entered through the capacitive touch screen by the electrically-conductive input module; and sequentially executing steps (B) through (F).

2. The method of managing supplemental user inputs for a mobile computing device, the method as claimed in claim 1 comprising the steps of:

providing the instruction-communicating feature as a personal area network (PAN) communication module, wherein the software instruction is stored on the PAN communication module; and relaying the software instruction from the PAN communication module to the mobile computing device during step (B).

3. The method of managing supplemental user inputs for a mobile computing device, the method as claimed in claim 1 comprising the steps of:

providing the instruction-communicating feature as a machine-readable optical label, wherein the software instruction is encoded into the machine-readable optical label; and scanning the software instruction from the machine-readable optical label with a camera of the mobile computing device during step (B).

4. The method of managing supplemental user inputs for a mobile computing device, the method as claimed in claim 1 comprising the steps of:

providing the plurality of electrically-conductive input modules with a touch button; and receiving the user tactile input as a pressed-button input with the mobile computing device during step (F), if the user tactile input is entered through the capacitive touch screen by the touch button.

5. The method of managing supplemental user inputs for a mobile computing device, the method as claimed in claim 1 comprising the steps of:

providing the plurality of electrically-conductive input modules with a touch annulus; and receiving the user tactile input as a plurality of static discrete inputs with the mobile computing device during step (F), if the user tactile input is entered through the capacitive touch screen by the touch annulus, and if the touch annulus is not moving on the capacitive touch screen, wherein the plurality of static discrete inputs is distributed about the touch annulus.

6. The method of managing supplemental user inputs for a mobile computing device, the method as claimed in claim 5, wherein the plurality of static discrete inputs is positioned equidistant from each other about the touch annulus.

7. The method of managing supplemental user inputs for a mobile computing device, the method as claimed in claim 1 comprising the steps of:

providing the electrically-conductive input module with a touch annulus; and receiving the user tactile input as a plurality of dynamic discrete inputs with the mobile computing device during step (F), if the user tactile input is entered through the capacitive touch screen by the touch annulus, and if the touch annulus is translationally and/or rotationally moving on the capacitive touch screen, wherein the plurality of dynamic discrete inputs is distributed about the touch annulus.

8. The method of managing supplemental user inputs for a mobile computing device, the method as claimed in claim 7, wherein the plurality of dynamic discrete inputs is positioned equidistant from each other about the touch annulus.

9. The method of managing supplemental user inputs for a mobile computing device, the method as claimed in claim 1, wherein the electrically-conductive input module includes a touch button and a touch annulus, and wherein the touch button is centrally mounted within the touch annulus, and wherein the touch annulus is mounted offset from the touch button, and wherein the touch button is encircled by the electrically-insulative filler, and wherein the electrically-insulative filler is encircled by the touch annulus.

10. The method of managing supplemental user inputs for a mobile computing device, the method as claimed in claim 1 comprising the steps of:

processing the user tactile input into at least one user instruction for the desired software with the mobile computing device after step (F); and executing the user instruction with the mobile computing device.

\* \* \* \* \*